(12) United States Patent
Tuffner et al.

(10) Patent No.: US 8,183,826 B2
(45) Date of Patent: May 22, 2012

(54) BATTERY CHARGING CONTROL METHODS, ELECTRIC VEHICLE CHARGING METHODS, BATTERY CHARGING APPARATUSES AND RECHARGEABLE BATTERY SYSTEMS

(75) Inventors: Francis K. Tuffner, Richland, WA (US); Michael C. W. Kintner-Meyer, Richland, WA (US); Donald J. Hammerstrom, West Richland, WA (US); Richard M. Pratt, Richland, WA (US)

(73) Assignee: Battelle Memorial Institute, Richland, WA (US)

( * ) Notice: Subject to any disclaimer, the term of this patent is extended or adjusted under 35 U.S.C. 154(b) by 337 days.

(21) Appl. No.: 12/467,192

(22) Filed: May 15, 2009

(65) Prior Publication Data

US 2010/0289451 A1 Nov. 18, 2010

(51) Int. Cl.
*H01M 10/44* (2006.01)
*H01M 10/46* (2006.01)
(52) U.S. Cl. ....................................................... 320/107
(58) Field of Classification Search .................. 320/107, 320/109, 132, 149
See application file for complete search history.

(56) References Cited

U.S. PATENT DOCUMENTS

| | | | |
|---|---|---|---|
| 2,238,624 A | 4/1941 | Clark |
| 3,862,430 A | 1/1975 | Lenhart et al. |
| 4,031,406 A | 6/1977 | Leyde et al. |
| 4,090,088 A | 5/1978 | McMahon et al. |
| 4,135,101 A | 1/1979 | Young et al. |
| 4,213,058 A | 7/1980 | Townsend |
| 4,309,644 A | 1/1982 | Reimers et al. |
| 4,317,049 A | 2/1982 | Schweppe |
| 4,385,241 A | 5/1983 | Peddie et al. |
| 4,449,178 A | 5/1984 | Blau, Jr. et al. |
| 4,472,640 A | 9/1984 | Elmer |
| 4,644,320 A | 2/1987 | Carr et al. |
| 4,835,706 A | 5/1989 | Asahi |
| 4,868,412 A | 9/1989 | Owens |
| 4,916,328 A | 4/1990 | Culp |
| 5,205,318 A | 4/1993 | Massaro et al. |
| 5,220,807 A | 6/1993 | Bourne et al. |
| 5,237,305 A | 8/1993 | Ishikuro et al. |
| 5,436,510 A | 7/1995 | Gilbert |
| 5,442,335 A | 8/1995 | Cantin et al. |
| 5,523,631 A | 6/1996 | Fishman et al. |

(Continued)

FOREIGN PATENT DOCUMENTS

CA 2082914 1/1999

(Continued)

OTHER PUBLICATIONS

U.S. Appl. No. 60/450,417, filed Feb. 26, 2003, Ockert et al.

(Continued)

*Primary Examiner* — Edward Tso
(74) *Attorney, Agent, or Firm* — Wells St. John, P.S.

(57) ABSTRACT

Battery charging control methods, electric vehicle charging methods, battery charging apparatuses and rechargeable battery systems. According to one aspect, a battery charging control method includes accessing information regarding a presence of at least one of a surplus and a deficiency of electrical energy upon an electrical power distribution system at a plurality of different moments in time, and using the information, controlling an adjustment of an amount of the electrical energy provided from the electrical power distribution system to a rechargeable battery to charge the rechargeable battery.

52 Claims, 5 Drawing Sheets

U.S. PATENT DOCUMENTS

| | | | |
|---|---|---|---|
| 5,543,667 A | 8/1996 | Shavit et al. | |
| 5,544,036 A | 8/1996 | Brown, Jr. et al. | |
| 5,548,200 A | 8/1996 | Nor et al. | |
| 5,566,085 A | 10/1996 | Marceau et al. | |
| 5,625,236 A | 4/1997 | Lefebvre et al. | |
| 5,627,759 A | 5/1997 | Bearden et al. | |
| 5,638,297 A | 6/1997 | Mansour et al. | |
| 5,642,270 A | 6/1997 | Green et al. | |
| 5,761,083 A | 6/1998 | Brown, Jr. et al. | |
| 5,762,266 A | 6/1998 | Okumura et al. | |
| 5,926,004 A | 7/1999 | Henze | |
| 5,927,598 A | 7/1999 | Broe | |
| 5,942,026 A | 8/1999 | Erlichman et al. | |
| 5,956,462 A | 9/1999 | Langford | |
| 5,959,368 A | 9/1999 | Kubo et al. | |
| 6,046,513 A | 4/2000 | Jouper et al. | |
| 6,067,482 A | 5/2000 | Shapiro | |
| 6,157,008 A | 12/2000 | Brown et al. | |
| 6,219,623 B1 | 4/2001 | Wills | |
| 6,269,274 B1 | 7/2001 | Steinman et al. | |
| 6,278,909 B1 | 8/2001 | Thibeault et al. | |
| 6,314,378 B1 | 11/2001 | Hodge et al. | |
| 6,348,777 B1 | 2/2002 | Brown et al. | |
| 6,367,023 B2 | 4/2002 | Kling et al. | |
| 6,429,546 B1 | 8/2002 | Ropp et al. | |
| 6,476,521 B1 | 11/2002 | Lof et al. | |
| 6,477,063 B2 | 11/2002 | Ishii et al. | |
| 6,487,509 B1 | 11/2002 | Aisa | |
| 6,490,141 B2 | 12/2002 | Fischer et al. | |
| 6,493,643 B1 | 12/2002 | Aisa | |
| 6,553,418 B1 | 4/2003 | Collins et al. | |
| 6,618,649 B1 | 9/2003 | Shilo | |
| 6,624,532 B1 | 9/2003 | Davidow et al. | |
| 6,633,823 B2 | 10/2003 | Bartone et al. | |
| 6,671,586 B2 | 12/2003 | Davis et al. | |
| 6,772,052 B1 | 8/2004 | Amundsen et al. | |
| 6,832,135 B2 | 12/2004 | Ying | |
| 6,861,956 B2 | 3/2005 | Ying | |
| 6,862,498 B2 | 3/2005 | Davis et al. | |
| 6,937,945 B2 | 8/2005 | Golder et al. | |
| 7,010,363 B2 | 3/2006 | Donnelly et al. | |
| 7,036,028 B2 | 4/2006 | Zalesski | |
| 7,069,117 B2 | 6/2006 | Wilson et al. | |
| 7,135,956 B2 | 11/2006 | Bartone et al. | |
| 7,309,966 B2 | 12/2007 | Wobben | |
| 7,541,757 B2 | 6/2009 | Wobben | |
| 7,777,434 B2 | 8/2010 | Wobben | |
| 2002/0072868 A1 | 6/2002 | Bartone et al. | |
| 2002/0162032 A1 | 10/2002 | Gunersen et al. | |
| 2002/0192519 A1 | 12/2002 | Fujita et al. | |
| 2003/0050737 A1 | 3/2003 | Osann, Jr. | |
| 2003/0078797 A1 | 4/2003 | Kanbara et al. | |
| 2003/0233201 A1 | 12/2003 | Horst et al. | |
| 2004/0078153 A1 | 4/2004 | Bartone et al. | |
| 2004/0095237 A1 | 5/2004 | Chen et al. | |
| 2004/0117680 A1 | 6/2004 | Naffziger | |
| 2004/0186671 A1 | 9/2004 | Golder et al. | |
| 2004/0190211 A1 | 9/2004 | Ockert et al. | |
| 2004/0254688 A1 | 12/2004 | Chassin et al. | |
| 2005/0077867 A1 | 4/2005 | Cawthorne et al. | |
| 2005/0120492 A1 | 6/2005 | Koo et al. | |
| 2005/0154499 A1 | 7/2005 | Aldridge | |
| 2006/0028178 A1 | 2/2006 | Hobbs | |
| 2006/0244411 A1 | 11/2006 | Wobben | |
| 2007/0282495 A1 | 12/2007 | Kempton et al. | |
| 2008/0052145 A1 | 2/2008 | Kaplan et al. | |
| 2008/0079374 A1 | 4/2008 | Wobben | |
| 2008/0218121 A1* | 9/2008 | Gale et al. | 320/109 |
| 2008/0306637 A1* | 12/2008 | Borumand et al. | 701/3 |
| 2009/0206779 A1 | 8/2009 | Wobben | |
| 2010/0017249 A1* | 1/2010 | Fincham et al. | 705/8 |
| 2010/0156348 A1* | 6/2010 | Kirchner | 320/109 |

FOREIGN PATENT DOCUMENTS

| | | |
|---|---|---|
| CA | 2354242 A1 | 12/2002 |
| EP | 0 372 961 A3 | 6/1990 |
| EP | 0 597 322 A3 | 5/1994 |
| EP | 1372238 | 12/2003 |
| GB | 2080640 A | 2/1982 |
| GB | 2361118 A | 10/2001 |
| GB | 2361118 B | 5/2002 |
| JP | 57-049332 | 3/1982 |
| JP | 3-503833 | 8/1991 |
| JP | 09-074674 | 3/1997 |
| JP | 10-009640 | 1/1998 |
| JP | 2003-149272 | 5/2003 |
| WO | WO89/08342 | 9/1989 |
| WO | WO99/52194 | 10/1999 |
| WO | WO 01/01542 A1 | 1/2001 |
| WO | WO 02/07365 A2 | 1/2002 |
| WO | WO 02/069471 A1 | 9/2002 |
| WO | WO03/001645 A2 | 1/2003 |
| WO | WO 03/001645 A3 | 1/2003 |
| WO | WO 03/008983 A2 | 1/2003 |
| WO | WO2005/009779 | 2/2005 |
| WO | PCT/US2010/034438 | 11/2010 |
| WO | PCT/US2010/034438 | 11/2011 |

OTHER PUBLICATIONS

U.S. Appl. No. 60/496,532, filed Aug. 20, 2003, Wallace et al.
U.S. Appl. No. 60/485,435, filed Jul. 8, 2003, Cannon et al.
"Distribution Automation;" http://www.dt2003.events.pennet.com/confrence_program.cfm; Feb. 2-4, 2003; 20 pps.
"Pay-For-Performance;" http://www.honeywellcannon.com/Designs/Pay-for-Performance.asp; Mar. 19, 2004; 3 pps.
"LCR 5000"; www.honeywellcannon.com/Products/LCR5000.html; Jun. 23, 2003; 3 pps.
"The Yukon System"; www.honeywellcannon.com/prducts/Yukon.html; Jun. 23, 2003; 7 pps.
"ExpressStat Programmable Demand Response Thermostat;" www.honeywellcannon.com/Products/ExpressStat.html; Jun. 23, 2003; 2 pp.
"Fast load shedding for angle stability control;" Rovnyak, et al.; Power Engineering Society General Meeting, 2003, IEEE , vol. 4 , Jul. 13-17, 2003; pp. 2275-2279.
"The status of demand response in New York;" Lawrence, D.J.; Neenan, B.F.; Power Engineering Society General Meeting, 2003, IEEE , vol. 4 , Jul. 13-17, 2003; pp. 2270-2274.
"Load response and system reliability situations;" Burke et al.; Power Engineering Society General Meeting, 2003, IEEE, vol. 4, Jul. 13-17, 2003; pp. 2285-2288.
"Demand side response 21st century style;" Covino, S.; Power Engineering Society General Meeting, 2003, IEEE ,vol. 4 , Jul. 2003, pp. 2280-2284.
"Considerations for load as a virtual generator for grid security;" Kehler, J.H.;Power Engineering Society General Meeting, 2003, IEEE,vol. 4 , Jul. 2003; pp. 2289-2292.
PCT/US2004/018333; Oct. 28, 2004; Written Opinion; 10pp.
"News & Events—Papers & Panels;" http://www.cannontech.com/news/papers.asp; Mar. 19, 2004; 3 pps.
"Statistical Mechanics: A Possible Model for Market-based Electric Power Control;" D.P. Chasin; Pacific Northwest National Laboratory; Jan. 2004; pp. 1-10.
"Power Market Dynamics: The Statistical Mechanics of Transaction-Based Control;" D.P. Chasin; Pacific Northwest National Laboratory; Jun. 30-Jul. 2, 2003; pp. 573-582.
"Mass Market Pay-for-Performance Incentive Plan;" Cannon Technologies; Mar. 19, 2004; pp. 1-10.
"Smart Load Control and Grid-Friendly Appliances"; Kintner-Meyer; Program Advisory Committee (PAC) of the project and CEC staff on Oct. 23, 2001; 7 pps.
"Demand Response—Direct Control;" http://www.cannontech.com/products/drdirectcontrol.asp; Nov. 19, 2003; 3 pps.
"SuperStat"; www.comverge-tech.com/sustat.html; 2002; 1 pp.
Mass Market Pay-for-Performance Demand Response—Price-Based Dr Programs with "No Interval Metering Required;" Backer, Doug; EnergyPulse.net; Feb. 18, 2003; 3 pps.
PCT/US2004/018332; Nov. 22, 2004; Written Opinion; 7pp.
"What is TWACS"; www.twacs.com; Jun. 23, 2003; 2 pps.
PCT/US2004/018333; Oct. 28, 2004; International Search Report; 6 pp.

"End-Use Load Control for Power System Dynamic Stability Enhancement" Dagle et al.; U.S. Dept. of Energy; Contract DE-AC06-76RLO 1830; PNNL-11488 US-221; Feb. 1997; 52 pp.

"Passive vs. Active Demand Response in Today's Marketplace;" Douglas Backer; Cannon Technologies, Inc.; Feb. 4, 2003; 7 pps.

PCT/US2004/018333; mailed Dec. 29, 2005; International Preliminary Report on Patentability, Chapter 1, 12 pp.

PCT/US2004/018332; mailed Dec. 29, 2005; International Preliminary Report on Patentability, Chapter 1,; 9 pp.

"What is Energy Star?"; www.energystar.gov/index.cfm?c=about.ab_index.html; Apr. 16, 2003; 2 pps.

PCT/US2004/018332; Nov. 22, 2004; International Search Report; 4pp.

"Standard BAL-005-0b-Automatic Generation Control"; http://www.nerc.com/files/BAL-005-0b.pdf; May 2, 2007; 7 pp.

Delivering Valuable Distributed Power Resources;Apr. 13, 2009; www.v2green.com/solutions/delivering-valuable-distributed-power-resources; 1 p.

"QuiQ-High-Efficiency Grid-Friendly Battery Charger"; Cameron et al.; Nov. 2003; 4 pp.

"Demand Response—Direct Control;" http://www.cannontech.com/products/drdirectcontrol.asp; Mar. 19, 2004; 3 pps.

"Vehicle-to-grid V2G"; page was last modified on Feb. 4, 2012; 10 pp.; http://en.wikipedia.org/wiki/Vehicle-to-grid.

\* cited by examiner

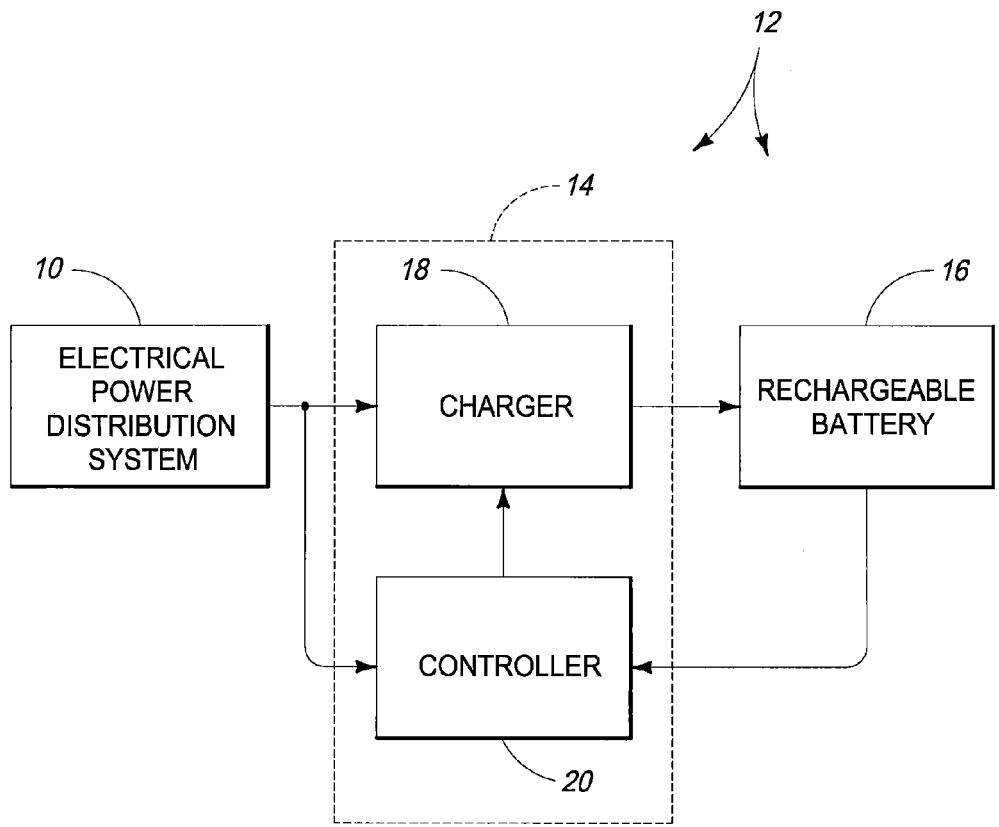
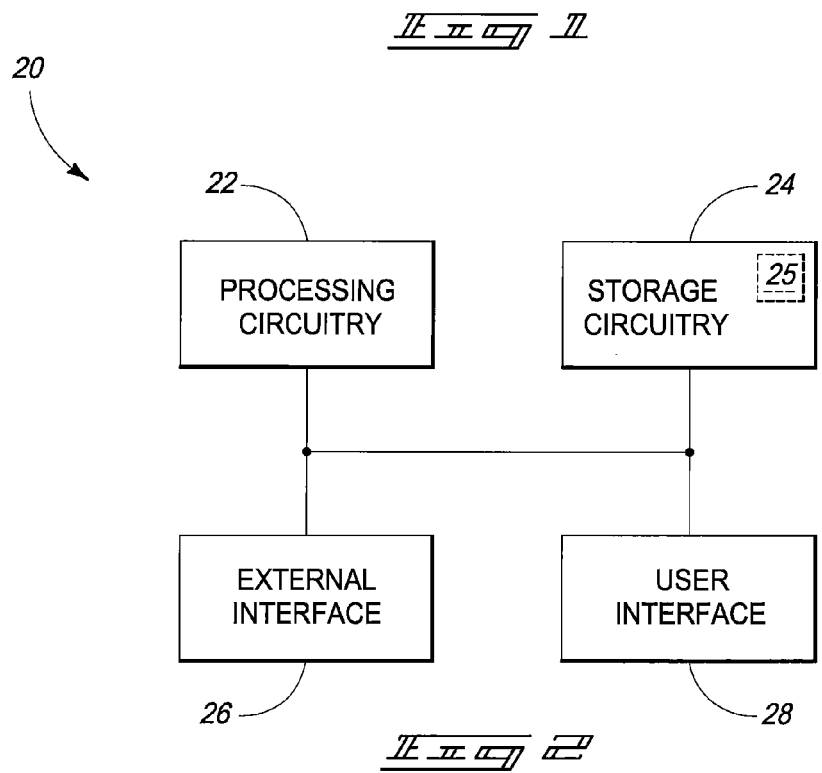

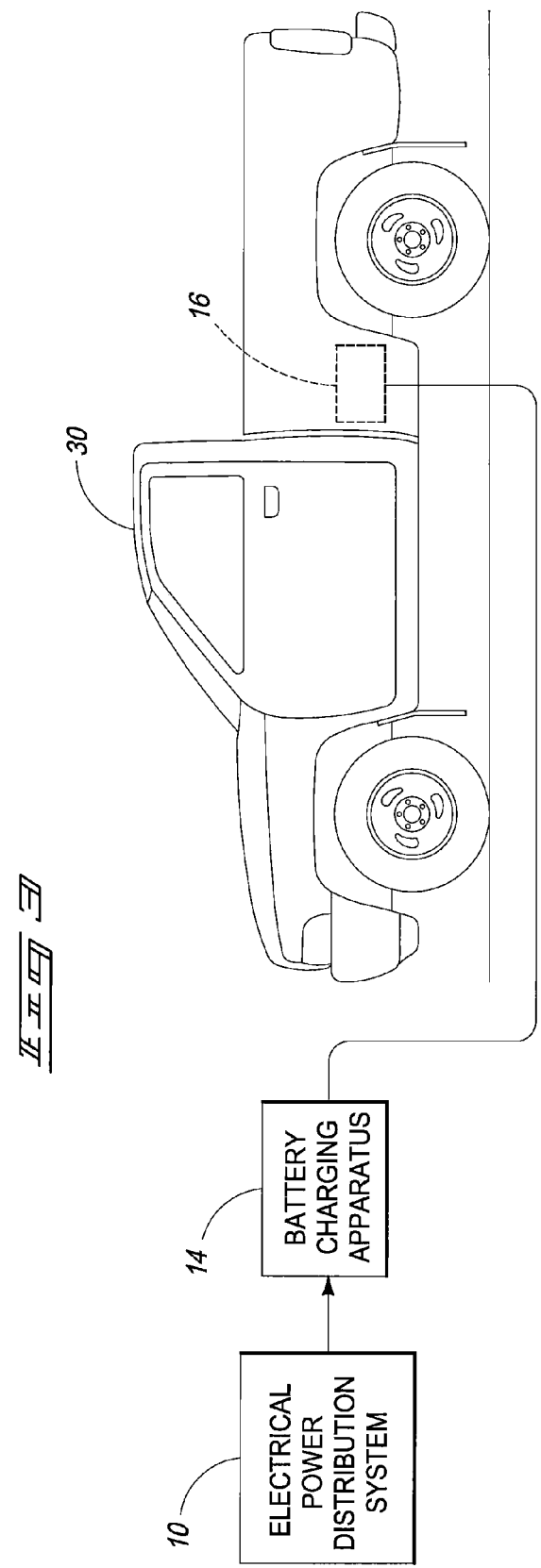

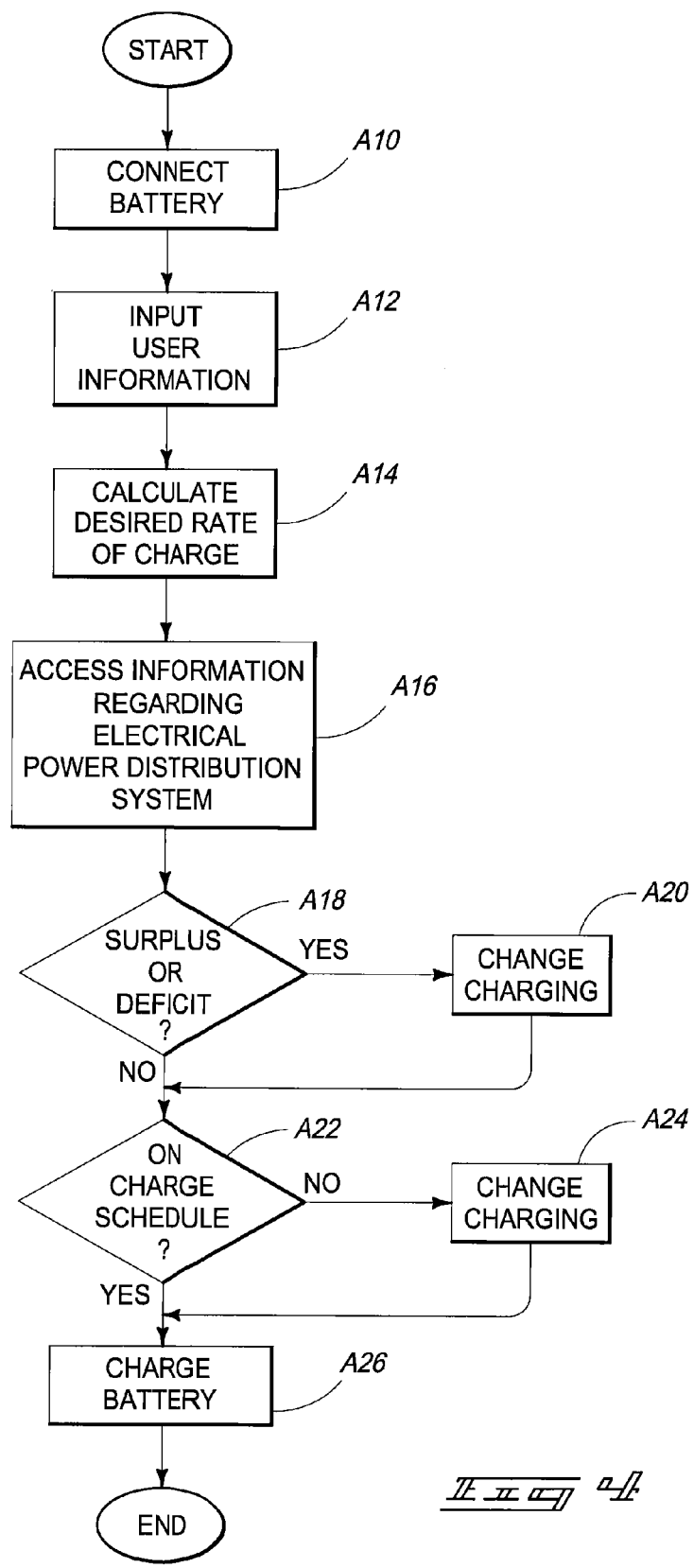

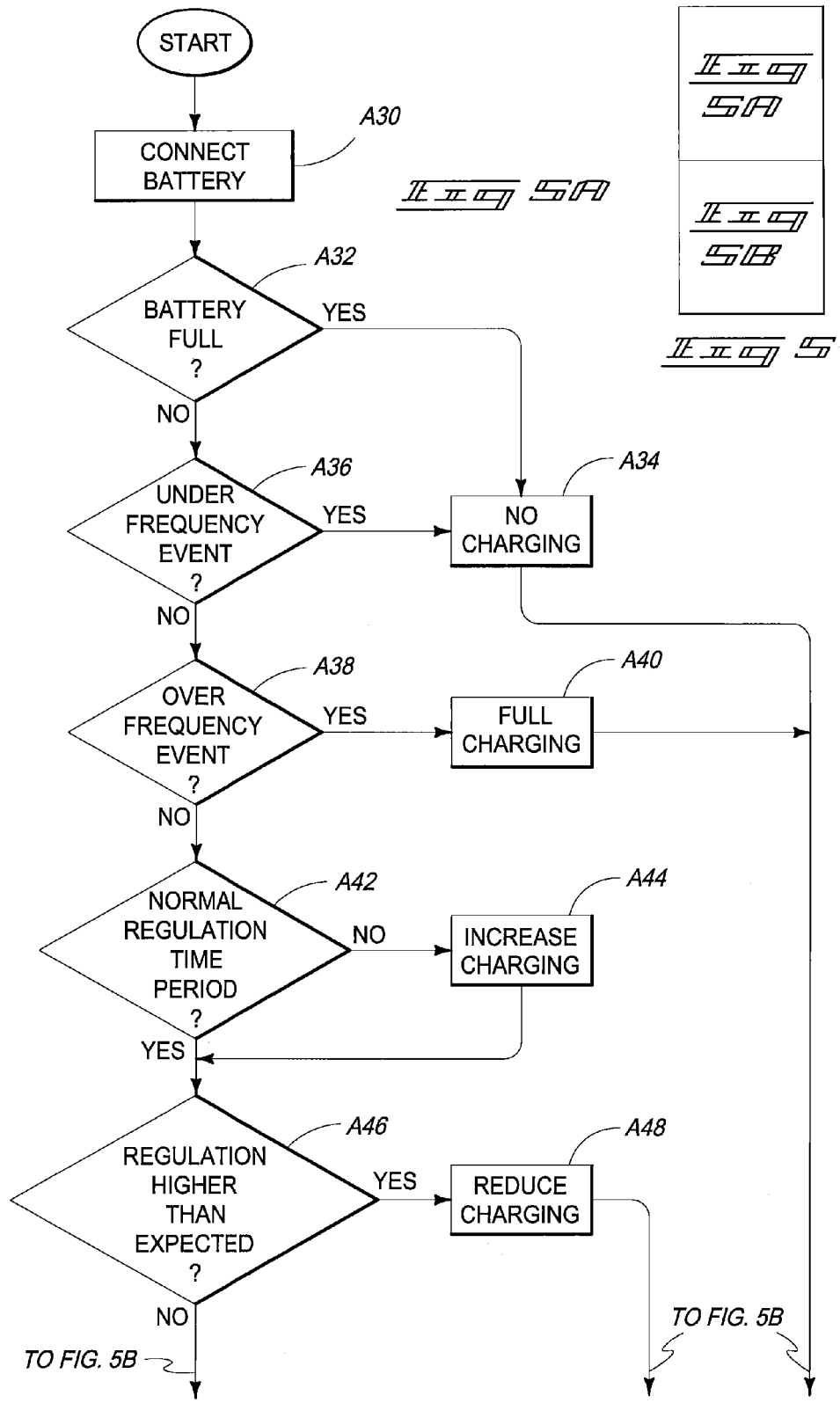

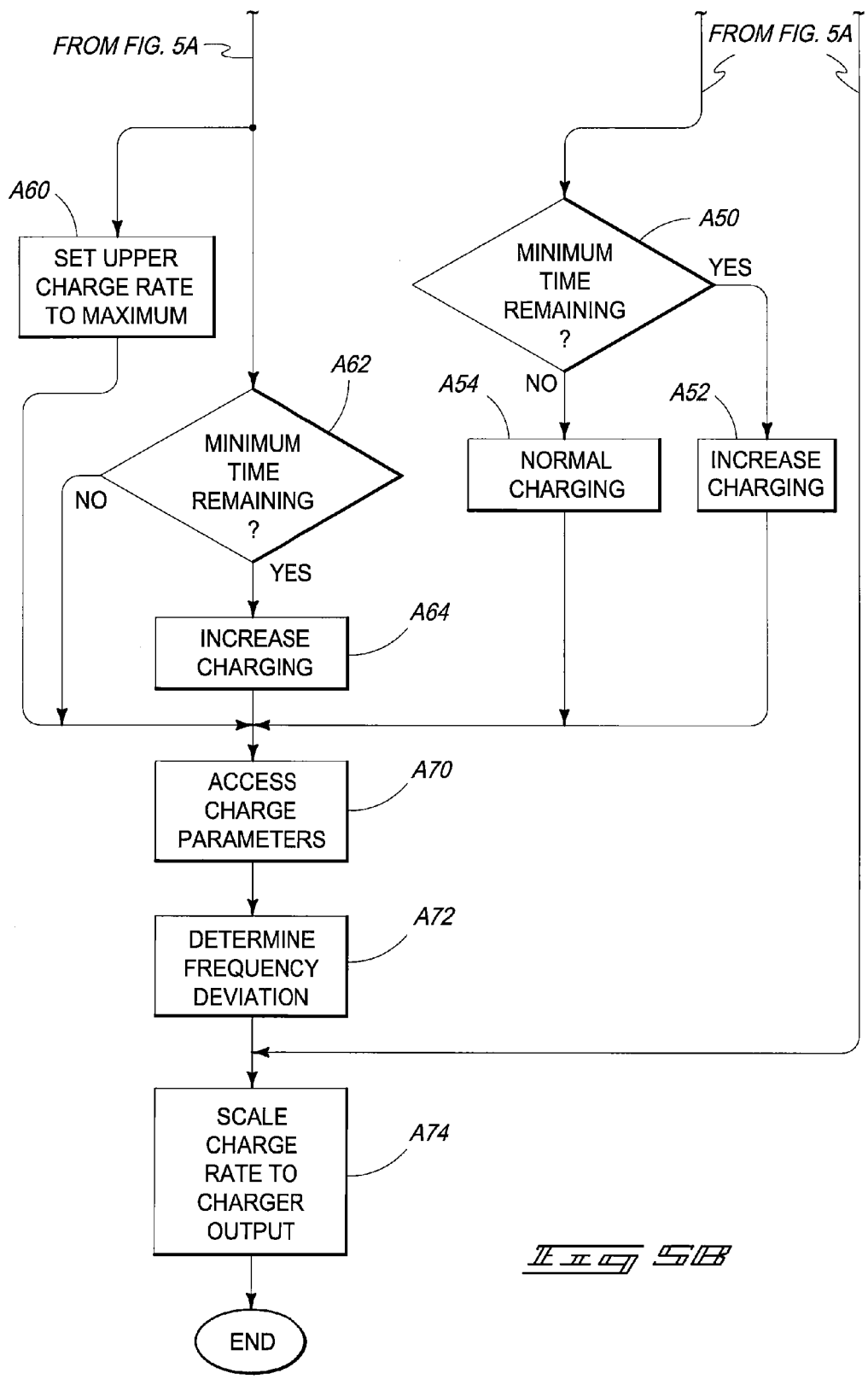

BATTERY CHARGING CONTROL METHODS, ELECTRIC VEHICLE CHARGING METHODS, BATTERY CHARGING APPARATUSES AND RECHARGEABLE BATTERY SYSTEMS

GOVERNMENT RIGHTS STATEMENT

This invention was made with Government support under contract DE-AC0676RLO1830 awarded by the U.S. Department of Energy. The Government has certain rights in the invention.

TECHNICAL FIELD

This disclosure relates to battery charging control methods, electric vehicle charging methods, battery charging apparatuses and rechargeable battery systems.

BACKGROUND OF THE DISCLOSURE

Consumption of and reliance upon electrical energy is ubiquitous in almost every aspect of life. Businesses, entertainment, communications, etc. are heavily dependent upon electrical energy for fundamental operation. More recently, use of electrical energy in transportation applications has increased and is expected to increase further. For example, some types of electric vehicles and hybrid electric vehicles use rechargeable batteries for power. Rechargeable batteries are also used with many other electrical devices apart from transportation devices (e.g., laptop computers, portable media devices, etc.). This expected increased usage of electrical energy for transportation and other applications using rechargeable batteries as well as increased usage in traditional applications may result in increased demands upon electrical power distribution infrastructure.

Power distribution systems or grids provide electrical energy to households, businesses, manufacturing facilities, hospitals, etc. Some electrical power distribution systems are ever-changing dynamic systems and operations are often concerned with balancing generation with load. Typically, control of the state of the electrical power distribution system is implemented by controlling operations of generators coupled with the system. For example, at times of increased demand, the output of generators may be increased and/or other generators may be brought on-line to assist with supplying the electrical energy. In addition, spinning reserves may be utilized to accommodate unexpected significant fluctuations in demand for electrical energy.

BRIEF DESCRIPTION OF THE DRAWINGS

Exemplary embodiments of the disclosure are described below with reference to the following accompanying drawings.

FIG. 1 is a block diagram of a battery system and an electrical power distribution system according to one embodiment.

FIG. 2 is a block diagram of a controller according to one embodiment.

FIG. 3 is an illustrative representation of an electrical vehicle coupled with a battery charging apparatus and an electrical power distribution system according to one embodiment.

FIG. 4 is a flow chart of a battery charging method according to one embodiment.

FIG. 5 is a map showing how FIGS. 5A and 5B are to be assembled. Once assembled, FIGS. 5A-5B depict a flow chart of a battery charging method according to another embodiment.

DETAILED DESCRIPTION OF THE DISCLOSURE

This disclosure is submitted in furtherance of the constitutional purposes of the U.S. Patent Laws "to promote the progress of science and useful arts" (Article 1, Section 8).

According to one embodiment, a battery charging control method comprises accessing information regarding a presence of at least one of a surplus and a deficiency of electrical energy upon an electrical power distribution system at a plurality of different moments in time, and using the information, controlling an adjustment of an amount of the electrical energy provided from the electrical power distribution system to a rechargeable battery to charge the rechargeable battery.

According to an additional embodiment, electric vehicle charging method comprises coupling an electrical vehicle having a depleted state of charge with an electrical power distribution system, charging the electrical vehicle using electrical energy from the electrical power distribution system, monitoring an electrical characteristic of the electrical energy from the electrical power distribution system, and adjusting an amount of the electrical energy provided from the electrical power distribution system to charge the electrical vehicle as a result of the monitoring.

According to another embodiment, a battery charging apparatus comprises processing circuitry configured to access information indicating at least one of a surplus and a deficiency of electrical energy upon the electrical power distribution system and to control an adjustment of an amount of electrical energy provided from the electrical power distribution system to a rechargeable battery to charge the rechargeable battery using the information.

According to an additional embodiment, a rechargeable battery system comprises a charger coupled with an electrical power distribution system and configured to provide electrical energy from the electrical power distribution system to a rechargeable battery to charge the rechargeable battery, and processing circuitry configured to monitor for a presence of at least one of a surplus and a deficit of electrical energy upon the electrical power distribution system and to control the charger to adjust an amount of the electrical energy provided from the electrical power distribution system to the rechargeable battery as a result of the monitoring detecting the presence of the at least one of the surplus and the deficit of the electrical energy upon the electrical power distribution system.

At least some aspects of the present disclosure are directed towards methods and apparatus which may assist with balancing electrical power distribution systems. In some example embodiments discussed herein, operations of loads consuming electrical energy may be adjusted to implement the balancing. In more specific illustrative examples, operations with respect to charging rechargeable batteries may be adjusted. In at least one embodiment described herein, information regarding an electrical power distribution system is used during charging of the rechargeable batteries to implement balancing. In one arrangement described below, information regarding a surplus or a deficit of electrical energy upon the electrical power distribution system is used to control one or more charging operation of the rechargeable batteries. Other aspects and embodiments are described herein and encompassed by the claims.

Referring to FIG. 1, one embodiment of a battery system 12 is shown coupled with an electrical power distribution system 10. Although only one battery system 12 is shown in the embodiment of FIG. 1, numerous additional battery systems 12 may be coupled with electrical power distribution system 10 in other embodiments. In one embodiment, electrical power distribution system 10 is arranged to provide electrical energy to the battery system 12 to charge one or more rechargeable battery 16 of the battery system 12. In some embodiments described below, the rechargeable battery or batteries 16 may be utilized to power an electric vehicle (e.g., plug-in electric hybrid vehicle (PHEV), electric vehicle (EV) etc.). Rechargeable batteries 16 may be used in other loads, apparatus and/or in different applications in other embodiments.

In one embodiment, electrical power distribution system 10 comprises any appropriate electrical energy delivery system configured to deliver residential, commercial, industrial, and/or other electrical energy from a supply to customers or consumers. Electrical power distribution system 10 is arranged to provide electrical energy for consumption by battery system 12, for example, for operation and for recharging the rechargeable batteries 16. Electrical power distribution system 10 may be arranged as one or more source (e.g., generator or other construction) configured to generate electrical energy. Generators may be individually taken on-line or off-line, or the output thereof may be adjusted, according to the usage of the electrical energy. Electrical power distribution system 10 may include a distribution grid which may comprise a plurality of switching stations, transformers, and transmission lines arranged to transmit electrical energy from sources to the battery systems 12 and other loads. The transmission lines may transmit the electrical energy using high voltage lines spanning across vast distances (e.g., hundreds or thousands of miles) between geographically distant locations in some arrangements.

In one implementation, electrical power distribution system 10 is arranged to provide alternating current electrical energy at a system frequency of 50 or 60 Hz. System frequency is the frequency of system voltage in one embodiment. Electrical power distribution system 10 may provide electrical energy at exemplary voltages of 120/240 VAC (residential), 120/208 VAC (commercial), 277/480 VAC (industrial) or other appropriate voltages in example arrangements.

As mentioned above, battery system 12 includes one or more rechargeable battery 16 in the presently described embodiment. Rechargeable batteries 16 may be used in various electrical devices including electric vehicles, notebook computers, cellular telephones, other portable electronic devices, etc. Rechargeable battery 16 may have different configurations in different implementations (e.g., lead acid, nickel hydride, lithium ion in some examples). During use, the state of charge of the rechargeable battery 16 decreases, and electrical power distribution system 10 is configured to supply electrical energy for re-charging of the rechargeable battery 16 to an increased state of charge.

In addition, battery system 12 also includes a battery charging apparatus 14 in one embodiment. In the depicted embodiment, battery charging apparatus 14 is coupled between electrical power distribution system 10 and rechargeable battery 16. Battery charging apparatus 14 is configured to implement charging operations of rechargeable battery 16 using the electrical energy from the electrical power distribution system 10 in one embodiment.

In the depicted embodiment, battery charging apparatus 14 includes a charger 18 and a controller 20. Charger 18 is configured to receive electrical energy from electrical power distribution system 10 and to provide the electrical energy to rechargeable battery 16 to charge the rechargeable battery 16. As discussed herein according to one embodiment, charger 18 can apply different amounts of electrical energy to the rechargeable battery 16 to vary the rates of charging at different moments in time.

In one embodiment discussed in additional detail below, controller 20 is configured to access information regarding the electrical power distribution system 10 and rechargeable battery 16. In some arrangements, the controller 20 may access the information at a plurality of moments in time during charging of a rechargeable battery 18. Further, controller 20 may control the amount of electrical energy provided by the charger 18 to the battery 16 to implement various rates of charging using the accessed information. In one more specific example embodiment discussed below, controller 20 is configured to access information regarding a surplus or deficiency of electrical energy upon the electrical power distribution system 10 and to control an adjustment of an amount of electrical energy provided by the distribution system 10 via the charger 18 to charge battery 16 using the accessed information (e.g., surplus or deficiency information).

In addition, controller 20 may access other information for use in controlling the rate of charging. For example, controller 20 may access rate of charge information, state of charge information regarding a current state of charge of the rechargeable battery, and user inputted information (e.g., desired point in time in the future for the battery 16 to be fully charged) to control the amount of electrical energy provided to the battery 16 in illustrative examples. Additional information may also be used by the controller 20 in other embodiments to control the amount of electrical energy provided to the battery 16.

Referring to FIG. 2, one embodiment of controller 20 is shown. The illustrated example controller 20 includes processing circuitry 22, storage circuitry 24, an external interface 26 and a user interface in the depicted embodiment. Controller 20 may include more, less and/or alternative components in other embodiments.

In one embodiment, processing circuitry 22 is arranged to implement operations of controller 20 described below. For example, processing circuitry 22 may process data, control data access and storage, issue commands, and control other desired operations. For example, processing circuitry 22 is configured to access information regarding a surplus and/or deficiency of electrical energy upon the electrical power distribution system 10, information regarding state of charge and rates of charge of rechargeable battery 16, and user inputted information in one embodiment. Processing circuitry 22 may utilize the accessed information to control charging operations of charger 18 with respect to rechargeable battery 16 in one embodiment.

Processing circuitry 22 may comprise circuitry configured to implement desired programming provided by appropriate media in at least one embodiment. For example, the processing circuitry 22 may be implemented as one or more of processor(s) and/or other structure configured to execute executable instructions including, for example, software and/or firmware instructions, and/or hardware circuitry. Exemplary embodiments of processing circuitry 22 include hardware logic, PGA, FPGA, ASIC, state machines, and/or other structures alone or in combination with a processor. These examples of processing circuitry 22 are for illustration and other configurations are possible.

The storage circuitry 24 is configured to store programming such as executable code or instructions (e.g., software and/or firmware), electronic data, databases, or other digital information and may include processor-usable media. For example, processing circuitry 22 may control storage circuitry 24 to store information accessed from system 10, battery 16 and/or user inputted information in one embodiment.

Processor-usable media may be embodied in any computer program product(s) or article of manufacture(s) 25 which can contain, store, or maintain programming, data and/or digital information for use by or in connection with an instruction execution system including processing circuitry in the exemplary embodiment. For example, exemplary processor-usable media may include any one of physical media such as electronic, magnetic, optical, electromagnetic, infrared or semiconductor media. Some more specific examples of processor-usable media include, but are not limited to, a portable magnetic computer diskette, such as a floppy diskette, zip disk, hard drive, random access memory, read only memory, flash memory, cache memory, and/or other configurations capable of storing programming, data, or other digital information.

At least some embodiments or aspects described herein may be implemented using programming stored within appropriate storage circuitry 24 described above and configured to control appropriate processing circuitry. For example, programming may be provided via appropriate media including, for example, embodied within articles of manufacture 25.

External interface 26 is arranged to implement external communications including data acquisition of controller 20 in one embodiment. For example, external interface 26 may be coupled with electrical power distribution system 10, rechargeable battery 16 and charger 18 in one embodiment. External interface 26 may be implemented as a network interface card (NIC), serial or parallel connection, USB port, Firewire interface, flash memory interface, floppy disk drive, ZigBee interface, Home Plug interface, X-10 interface, or any other suitable arrangement.

User interface 28 is configured to interact with a user including conveying data to a user (e.g., displaying data for observation by the user, audibly communicating data to a user, etc.) as well as receiving inputs from the user (e.g., tactile input, voice instruction, etc.). Accordingly, in one exemplary embodiment, the user interface 28 may include a display (e.g., cathode ray tube, LCD, etc.) configured to depict visual information and an audio system as well as a keyboard, mouse and/or other input device. Any other suitable apparatus for interacting with a user may also be utilized. In one arrangement, a user may input information to control the charging by charger 18. For example, the user may specify a point of time in the future in which the battery 16 is to be fully charged or obtain some other desired state of charge.

As discussed above with respect to FIG. 1, controller 20 is configured to control the charging rate of charger 18 of battery charging apparatus 14 with respect to battery 16 in one embodiment. Battery charging apparatus 14 may use information from various sources to implement the control of the charging in one embodiment.

In one embodiment, controller 20 is configured to utilize one or more of: information regarding a state of electrical energy upon electrical power distribution system 10, information regarding a rate of charging and a state of charge of the rechargeable battery 16, and/or information regarding a desired point in time where the rechargeable battery 16 is to be fully charged to control the charging of the rechargeable battery 16 by charger 18.

In one embodiment, controller 20 accesses information regarding the state of electrical energy upon the electrical power distribution system 10 which indicates whether there is a surplus or deficiency of electrical energy within the electrical power distribution system 10 at a plurality of moments in time. In one configuration, controller 20 is configured to monitor the electrical power distribution system 10 at different moments in time to determine the state of electrical energy upon the system 10 at the different moment in time.

For example, in one embodiment, controller 20 may access information regarding the distribution system 10 by monitoring electrical energy received from the distribution system 10 at the location of the battery system 12 and without data communications with the electrical power distribution system 10. In other embodiments, battery charging apparatus 14 obtains information regarding the state of the electrical power distribution system 10 using different methods than by monitoring the electrical energy from the system 10. For example, in another embodiment, controller 20 may receive information regarding the state of the distribution system 10 from the distribution system 10 itself (e.g., internet data communications from an appropriate utility entity indicating a surplus or deficiency of electrical energy upon the distribution system 10 at different moments in time) or from some other appropriate source. The above examples are some methods of accessing information regarding a state of the distribution system 10. Controller 20 which is configured to monitor the energy upon the system 10 to determine the state of electrical energy 10 described above according to one embodiment may be considered to be a passive system. This implementation may have cost benefits compared with arrangements utilizing communications from an entity of the distribution system 10 or other source with the battery system 12 since communications infrastructure is not needed to implement the monitoring operations.

As mentioned above, the controller 20 may monitor the distribution system 10 in one implementation. In one more specific example, the controller 20 may monitor one or more electrical characteristic of electrical energy received from the system 10 at various moments in time to determine the state of electrical energy upon the system 10 at the different moments in time (e.g., determine information regarding a surplus or deficit of electrical energy upon system 10).

As mentioned above, electrical power distribution system 10 provides electrical energy at a system frequency (of voltage of the electrical energy) which generally corresponds to a nominal frequency (e.g., 50 or 60 Hz). When the electrical power distribution system 10 is substantially balanced (i.e., the amount of electrical energy generated substantially matches the amount of electrical energy being consumed), then the system frequency of the electrical energy upon the system 10 is at the nominal frequency. However, due to fluctuations in power generation and consumption throughout a given day, the system frequency may vary and deviate from the nominal frequency. For example, the system frequency rises if the amount of produced electrical energy exceeds the amount of consumed electrical energy and the system frequency falls if the amount of produced electrical energy is less than the amount of consumed electrical energy.

Accordingly, in one embodiment, controller 20 is configured to monitor the system frequency of the electrical power distribution system 10 to access information regarding the state of electrical energy upon system 10 (e.g., the presence of a surplus or deficit of electrical energy upon the distribution system 10). In another embodiment, controller 20 may access frequency information from another device such as a smart meter, advanced meter infrastructure (AMI) or the distribution system 10 itself, for example, via data communications. If data is obtained at a higher sample rate than desired, an averaging or low-pass filter may be utilized to effectively decimate the data to a desired sampling rate in one embodiment. Additional details with respect to monitoring frequency of the electrical power distribution system 10 are described in U.S. Pat. No. 7,149,605, entitled "Electrical Power Distribution Control Methods, Electrical Energy Demand Monitoring Methods, And Power Management Devices", assigned to the assignee hereof and the teachings of which are incorporated herein by reference. Other electrical characteristics of electrical energy of the system 10 may be monitored to determine surpluses or deficiencies of energy on the system 10 in other embodiments. For example, voltages or harmonics may be monitored.

In one example, the controller 20 continually compares the instantaneous system frequency of the voltage of the electrical energy of the system 10 at a given moment in time (also referred to as current frequency) with respect to the nominal frequency of the voltage of the electrical energy of the system 10 to determine the state of the distribution system 10 at the corresponding moment in time. A fixed value (e.g., 60 Hz) may be used as the nominal frequency in one embodiment. In another embodiment described below, the nominal frequency may be calculated as an average of the system frequency over a period of time, for example using a sliding-window.

If the monitored frequency is above the nominal frequency at a given moment in time, there is a surplus of electrical energy upon the distribution system 10 at the given moment in time indicating the generation of electrical energy is exceeding the consumption of the electrical energy. If the monitored frequency is below the nominal frequency at the given moment in time, there is a deficit of electrical energy upon the distribution system 10 at the given moment in time indicating the consumption of electrical energy exceeds the generation of the electrical energy. Accordingly, in one embodiment, the controller 20 may compare information regarding the current frequency at different moments in time with the nominal frequency to determine if there is a surplus or a deficit of electrical energy upon the distribution system 10 at the different moments in time.

As discussed herein according to one embodiment, battery system 12 may be used as a regulation system in an attempt to balance generation and consumption of electrical energy upon the distribution system 10 which may minimize stresses upon the distribution system 10. In one embodiment, controller 20 may use the information regarding the state of the distribution system 10 (e.g., using the results of the comparison of the current frequency with the nominal frequency) to control an adjustment of the amount of electrical energy provided by charger 18 to charge the battery 16 in an attempt to reduce an amount of deficit or surplus energy upon the system 10 to balance the system 10. In a more specific example, controller 20 may control an increase in an amount of electrical energy used to charge battery 16 if accessed information indicates there is a surplus of electrical energy upon system 10 at one moment in time or decrease an amount of electrical energy used to charge battery 10 if accessed information indicates there is a deficit of electrical energy upon system 10 at another moment in time. Accordingly, battery system 12 including a battery charging apparatus 14 may be considered to be a regulation device which may be used to attempt to stabilize the system 10 by attempting to reduce a surplus or deficit of electrical energy upon system 10 in one embodiment.

As mentioned above, information regarding a rate of charging of the battery 16 may also be used to control charging operations with respect to battery 16 in one embodiment. In one embodiment, controller 20 may monitor a rate of charging of the battery 16 during a charge process of the battery 16. For example, the controller 20 may access state of charge information of battery 16 at a plurality of different moments in time during the charge process to determine the actual rate of charging of the battery 16. In some embodiments, it is desirable to avoid situations where the battery 16 is quickly brought to a full charge. More specifically, once the battery 16 is fully charged, the amount of electrical energy used by charger 18 may be greatly reduced (e.g., perhaps only a relatively small amount of energy is used for trickle charging) and the ability of battery charging apparatus 14 to function as a regulation device may be similarly reduced if there is a surplus of electrical energy present upon the system 10.

According to one embodiment, controller 20 compares the actual rate of charge information with respect to a desired rate of charge of the battery 16 and may control operations of the charger 18 as a result of the comparison. More specifically, in one embodiment, a user may input a desired point in time in the future for the rechargeable battery to be fully charged (or otherwise charged to a different desired state of charge). Controller 20 may use this desired point in time to determine an amount of time remaining from the present time to the desired point in time to determine a desired rate of charge of battery 16 (e.g., referred to as a needed charge rate in examples below). If the battery 16 is charging too quickly with respect to the desired rate of charge as a result of the comparison, the controller 20 may control the charger 18 to reduce an amount of electrical energy used to charge the battery 16. If the battery 16 is charging too slowly compared with the desired rate of charge, the controller 20 may control the charger to increase the amount of electrical energy used to the charge the battery 16. The above-described example charging allows the battery system 12 to provide the battery charging functionality as a regulation device of system 12 for an extended period of time during the charging process compared with arrangements which do not monitor rate of charge.

In another embodiment, the controller 20 may also monitor the remaining amount of time until the battery 16 is to be charged to the desired state of charge at the desired point of time in the future in an attempt to accommodate the desires of the user. If the battery 16 is charging too slowly, the controller 20 may increase the rate of charge in an effort to provide the battery 16 in the desired state of charge at the desired point of time in the future.

Referring to FIG. 3, one embodiment of charging operations of battery system 12 is described with respect to a load in the form of an electric vehicle 30 which includes one or more rechargeable battery 16. The arrangement of the battery system 12 of FIG. 3 is illustrative for explanation of some aspects of the disclosure and other arrangements are possible. For example, the battery charging apparatus 14 of battery system 12 may be installed at home, work, or any other location where it is desirable to implement charging of rechargeable battery 16 and electrical energy from electrical power distribution system 10 is available for consumption. Furthermore, rechargeable batteries 16 may be utilized in different applications other than vehicles 30 and which may be charged by battery charging apparatus 14. Additionally, one or more components of the battery system 12 may be implemented differently in other embodiments. For example, battery charging apparatus 14 may also be located within the vehicle 30 in some implementations. In some embodiments, the battery 16 may be removed from the device being powered and coupled with the battery charging apparatus 14.

Referring to FIG. 4, a method for charging a battery is shown according to one embodiment. The illustrated method may be executed or otherwise implemented by controller 20 in one arrangement. In one embodiment, the illustrated method may be repeatedly executed during a charge cycle of a battery. Other methods are possible including more, less and/or additional acts.

At an act A10, a user connects the battery system to the electrical power distribution system. For example, the user may connect his electric vehicle to the electrical power distribution system for recharging when he arrives home from work. The controller detects the connection at step A10.

At an act 12, the controller accesses user inputted information. For example, the inputted information may specify the desired point of time in the future when the vehicle is expected to be fully charged (or at some other desired state of charge).

At an act 14, the controller accesses the present time, for example from an internal clock, and the desired point of time in the future when the vehicle is to be fully charged and may calculate a desired charge rate using the present time and the desired point of time in the future when the vehicle is to be fully charged.

At an act 16, the controller accesses information regarding the electrical power distribution system. For example, the controller may access information regarding the instant frequency of the system and the average frequency of the system.

At an act A18, the controller determines whether there is a surplus or deficit of electrical energy upon electric power distribution system. For example, the controller may compare the information regarding the instant frequency of the system with respect to the average frequency of the system to determine if there is a surplus or deficit of electrical energy upon the system.

If act A18 is affirmative, the controller proceeds to an act A20. At act A20, the controller changes the amount of electrical energy used to charge the battery according to the surplus or deficit of electrical energy upon the system. For example, if there is a surplus of electrical energy, the controller may increase the amount of electrical energy used to charge the rechargeable battery. If there is a deficit of electrical energy, the controller may decrease the amount of electrical energy used to charge the rechargeable battery.

In one embodiment, the controller may also refer to time of day information to implement charging. For example, if a user connects the battery at a critical peak time of the day (e.g., in the afternoon when air conditioners may be used), the controller may delay a start time of charging until the critical peak time has passed. The controller may access a schedule (e.g., internally or from the utility) of critical peak times to control when charging is started in one embodiment.

If act A18 is negative, the controller proceeds to an act A22 to determine whether the charging of the battery is on schedule. For example, the controller may compare the actual rate of charge with the desired rate of charge to determine whether the charging process for the current charge cycle is on schedule.

If act A22 is negative, the controller proceeds to act A24 to change the amount of electrical energy used to charge the battery according to the actual rate of charge. In one embodiment, the controller may decrease the amount of electrical energy used to charge the battery if the charging of the battery is faster than desired or the controller may increase the amount of electrical energy used to charge the battery if the charging of the battery is slower than desired.

If act A22 is negative, the controller proceeds to an act A26 to control the charging of the battery using the appropriate amount of electrical energy.

Referring to FIGS. 5A and 5B, another method for charging a battery is shown according to one embodiment. The illustrated method may be executed or otherwise implemented by controller 20 in one arrangement. In one embodiment, the illustrated method may be repeatedly executed during a common charge cycle of a battery. Other methods are possible include more, less and/or additional acts.

At an act A30, a user connects the battery system to the electrical power distribution system. The controller detects the connection at step A30.

At an act A32, the controller accesses information regarding the present state of the charge of the battery and determines whether the battery is fully charged.

If act A32 is affirmative, the controller proceeds to an act A34 where no charging is implemented using the battery charging apparatus.

If act A32 is negative, the controller proceeds to an act A36 to determine if the electrical power distribution system is experiencing an under frequency event. In one embodiment, the controller monitors for the presence of a significant under frequency event at act A36. In a specific example, the controller compares the current frequency with respect to a threshold corresponding to a deviation of the current frequency below the nominal frequency. For an example system having a nominal frequency of 60 Hz, the threshold may be 59.95 Hz in one embodiment indicative of a relatively significant under frequency event. Other thresholds may be used in other embodiments.

If act A36 is affirmative, the controller proceeds to act A34 where minimal charging is implemented using the battery recharging apparatus (e.g., the charger performs no charging in one arrangement).

If act A36 is negative, the controller proceeds to an act A38 to determine if the electrical power distribution system is experiencing an over frequency event. In one embodiment, the controller monitors for the presence of a significant over frequency event at act A38. In a specific example, the controller compares the current frequency of the electrical energy with respect to a threshold corresponding to a deviation of the current frequency above the nominal frequency. For an example system having a nominal frequency of 60 Hz, the threshold may be 60.05 Hz in one embodiment indicative of a relatively significant over frequency event. Other thresholds may be used in other embodiments.

If act A38 is affirmative, the controller proceeds to an act A40 where charging is implemented by the battery recharging apparatus using a maximum amount of electrical energy (e.g., the charger charges at its maximum rate).

If act A38 is negative, the controller proceeds to an act A42 to determine whether the recharging of the battery is presently charging within the normal regulation time period. In one embodiment, the normal regulation time period may correspond to the time period of a charging cycle which occurs after charging is initiated until a fixed period of time threshold (e.g., thirty minutes) before the point in time when the battery is desired to be fully charged. In one embodiment, the controller calculates the remaining amount of time for charging from the present time to the desired point of time in the future for full charge and compares the calculated remaining amount of time with the threshold to determine whether the charging is within the normal regulation time period (e.g., the remaining amount of time for charging is greater than the threshold).

If the condition of act A42 is negative, the controller proceeds to an act A44 where the controller increases the rate of the charging (e.g., increases the amount of electrical energy used to charge the battery). In one embodiment, the controller scales a needed charge rate (i.e., the needed charge rate may be defined as the charge rate needed to achieve full charge by the desired point of time in the future for example using the capacity information of the battery, time remaining to reach full charge and the charger efficiency). At act A44, the controller may multiply the needed charge rate by 1.01 providing a new needed charge rate and which increases the rate of charging of the battery in one embodiment.

In one embodiment, if the result of A42 is affirmative, the controller may reset the charging to the needed charge rate prior to proceeding to act A46. In one embodiment, the controller compares the actual charge rate with the desired charge rate at act A46. In a more specific example, the controller determines whether a regulation ratio value is greater than a regulation high deviation limit for the condition of act A46. In one embodiment, the regulation ratio value is calculated by (measured charge rate−needed charge rate) divided by the maximum charge rate of the charger where the measured charge rate is the average rate of charge of the charger measured over a period of time (e.g., 5 minutes). The result of this calculation may be multiplied by 100 for a percentage to provide the regulation ratio value. In one embodiment, the regulation high deviation limit is a limit above the needed charge rate to which charging can exceed the needed charge rate in one embodiment (e.g., a percentage such as 15% in one embodiment).

Following the processing in act A46, the controller follows plural routes via the yes and no branches out of act A46 to set the average charge rate and the upper and lower charge rates which scale or map the charger output based upon the frequency of electrical energy of the distribution system deviating from the nominal frequency in the described example. In one embodiment, the upper and lower charge rates limit the adjustment to an average charge rate which controls the output of the charger using information regarding the system frequency of the electrical power distribution system. In one embodiment, the average charge rate is an output of the charger when the system frequency of the electrical power distribution system is at the nominal frequency in one embodiment. The average charge rate may be adjusted up or down in subsequent acts depending on whether the system frequency goes up or down relative to the nominal frequency, respectively as described further below. In other words, the upper and lower charge rates determine the minimum and maximum output of the charger based upon frequency deviation from the nominal frequency. The determination of the upper and lower charge rate may be determined using information regarding an amount of time left to charge the battery in one embodiment.

If the condition of act A46 is affirmative, the controller proceeds to an act A48 to reduce the rate of charge (e.g., decrease the amount of electrical energy used to charge the battery) which extends the length of time the battery charging apparatus 14 is available as a regulation device to assist balancing of electrical power distribution system. In one embodiment, the controller determines whether the needed charge rate is greater than the maximum charge rate of the charger and limits the needed charge rate to the maximum charge rate if the needed charge rate is greater than the maximum charge rate of the charger. The controller sets the average charge rate equal to the needed charge rate.

Following act A48, the controller proceeds to an act A50 to determine whether a minimum time is remaining to charge the battery. For example, the controller can determine the time left ratio as an amount of time for the battery to be fully charged if the charger is set to maximum charging output compared with the remaining period of time to charge the battery. The controller determines whether the time left ratio is greater than a critical limit (e.g., 98.5% in one example).

If the condition of act A50 is affirmative, the controller proceeds to an act A52 to increase the charging by setting the upper and lower charge rates to allow an increased charge rate of the charger. For example, the upper charge rate is set to be the maximum charge rate minus the average charge rate and the lower charge rate is set to be the average charge rate*(1−time left ratio).

If the condition of act A50 is negative, the controller proceeds to an act A54 to implement normal charge scaling. At act A54, the controller limits upward adjustment of the rate of charging due to subsequent frequency analysis if the amount of time remaining to reach full charge is greater than a threshold, such as 30 minutes. If the amount of time remaining is greater than the threshold, the controller sets the upper charge rate to zero if the average charge rate is greater than the maximum charge rate. Otherwise, the upper charge rate is set to (maximum charge rate−average charge rate). The controller also sets the lower charge rate to the average charge rate. If the amount of time remaining is less than the threshold, the controller may restrict the upper and lower charge rates to be close to the average charge rate. In one specific example, the controller sets the lower charge rate to be the average charge rate divided by three. For the upper charge rate, the controller determines whether the maximum charge rate divided by two is greater than the average charge rate. If the answer is yes, the controller sets the upper charge rate to be equal to a value determined by (the maximum charge rate of the charger minus the average charge rate)/3. If the answer is no, the controller sets the upper charge rate to be the maximum charge rate minus the average rate.

Referring again to the condition of act A46, if the condition of act A46 is negative, the controller sets the average rate to be the needed charge rate (capped by the maximum charge rate of the charger if appropriate) and proceeds to acts A60 and A62 in parallel.

At act A60, the upper charge rate is set to be the maximum charge rate minus the average charge rate.

At act A62, the controller determines whether a minimum time is remaining to charge the battery (similar to act A50). As discussed above, the controller can determine the time left ratio as an amount of time for the battery to be fully charged if the charger is set to maximum charging output compared with the remaining period of time to charge the battery. The controller determines whether the time left ratio is greater than a critical limit (e.g., 98.5% in one example).

If the condition of act A62 is affirmative, the controller proceeds to an act A64 to increase the charge rate by setting the lower charge rate to allow increased rate of charge of the charger. In one embodiment, the lower charge rate equals the average charge rate*(1−time left ratio) (similar to act A52).

If the condition of act A62 is negative, in one embodiment, the lower charge rate is set to the average charge rate and the controller proceeds to an Act A70.

At an Act A70, the controller accesses the charger parameters. In the described example, these parameters include the previously determined average charge rate, and upper and lower charge rates.

At an Act A72, the frequency deviation of electrical energy on the distribution system is determined which compares the current frequency of the electrical energy of the distribution system with the nominal frequency of the electrical energy of the distribution system. In one embodiment, an average frequency of the electrical energy is calculated and used as the nominal frequency. One example method for obtaining the average frequency information from direct measurements of the electrical energy received at the location of the battery charging apparatus may use a simple recursive implementation of a finite-impulse response (FIR) filter. In one embodiment, this filter computes the average frequency for a predetermined amount of time prior to the execution of the described method. In one embodiment, the amount of time of taking measurements to determine the average frequency is five minutes. In some arrangements, the filter may be reinitialized if the system frequency has gone significantly under or over the average frequency (e.g., if the frequency exceeds the under frequency or over frequency thresholds mentioned earlier by a significant amount such as a measurement of 61.5 Hz when the threshold is 60.05 Hz).

At an Act A74, the controller scales the charge rate to the charger output. If the current frequency is greater than the average frequency, normalization of the current frequency measurement to a historical frequency measurement may be implemented according to (current frequency−average frequency)/(maximum frequency−average frequency) where the maximum frequency may be the maximum value of the system frequency during a previous amount of time, such as two minutes. The normalized output may then be multiplied by the upper charge rate previously calculated and added to the average charge rate to determine the appropriate rate of charging. If the current frequency is less than the average frequency, a normalization may be implemented according to (current frequency−average frequency)/(average frequency−the minimum frequency) where the minimum frequency may be the minimum value of the system frequency during a previous amount of time, such as two minutes. The normalized output may be multiplied by the lower charge rate previously calculated and added to the average charge rate to determine the appropriate charge rate to be applied to the battery.

Example programming comprising c-code for controlling controller 20 to implement the methods described herein according to one embodiment is shown below in Table A. Other programming may be used in other embodiments.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

Further, aspects herein have been presented for guidance in construction and/or operation of illustrative embodiments of the disclosure. Applicant(s) hereof consider these described illustrative embodiments to also include, disclose and describe further inventive aspects in addition to those explicitly disclosed. For example, the additional inventive aspects may include less, more and/or alternative features than those described in the illustrative embodiments. In more specific examples, Applicants consider the disclosure to include, disclose and describe methods which include less, more and/or alternative steps than those methods explicitly disclosed as well as apparatus which includes less, more and/or alternative structure than the explicitly disclosed structure.

TABLE A

```
/********************************************************************
// Frequency regulation C function
// written based upon floating point being included
//
// Function has minimal UF/OF handling. Most of this is
// presumed to be handled in the external GFA chip.
********************************************************************/
extern struct battery_mgmt_t battery;
extern struct gfa_control_t gfa;
extern long PeriodAvg, Period, FreqValue[128];
//Globals
uint8 FreqRegStatus;          //Status bits for frequency-regulation algorithm
/******************* Variable Descriptions *****************************
//Actual frequency regulation function
//All values in seconds - e.g. Batt_Cap = A-seconds, not A-hours
//PercentOut = 0 – 100 signal for final charger output
//TimeLeft = time left in charging period in seconds
//Batt_SOC = percent state of charge (5.0 = 5%)
//AvgRate = Average battery rate charge rate in Amps
//MaxChargeRate = Maximum battery charge rate in Amps
//ChargeEfficiency = ratio of efficiency (0.98 = 98% efficient)
//UpDevPercent = percent the average charge rate is allowed to exceed the
//    "nominal" rate before regulation up is restricted
//TimeRatioCritCharge - time ratio (Needed charge time over minimum necessary
//    charge time) before algorithm maxes rate to try and reach 100% SOC
//TimeLeftLimitReg - time in seconds before regulation algorithm starts
//    limiting itself so a 100% SOC can be reached in time
//
//Imported variables (globals elsewhere)
//FreqValue - Array of frequencies (period) stored for min/max calculations
//battery - Structure of battery information of interest are:
//    battSOC - battery state of charge as a % (e.g. 78 = 78%)
//    battCapacityAhr - total capacity in Amp Hours (convert to Amp-seconds)
//Period - current period measurement
//PeriodAvg - Average period measurement
********************************************************************/
int FreqRegulation(uint32 TimeLeft, float AvgRate, float MaxChargeRate, float
ChargeEfficiency, float UpDevPercent, float TimeRatioCritCharge, uint16
TimeLeftLimitReg)
{
float BattCapacityLeft, TimeRatio, RegRatio;
float NeededRate, SlopeDiffVal, AVGChargeRate, LowerChargeRate,
        UpperChargeRate;
```

TABLE A-continued

```
float PercentMax = 0;
long MaxFreqVal = 0x7FFFFFFF, MinFreqVal = 0;      // 1,250,000 / Freq
static int PercentOut;
int i;
//Find min and max frequency (period)
for (i = 0; i < 64; i++) {
        if (MinFreqVal > FreqValue[i]) MinFreqVal = FreqValue[i];
        if (MaxFreqVal < FreqValue[i]) MaxFreqVal = FreqValue[i];
}
//Initial time keeping
MaxChargeRate /= 10;
// Figure out battery capacity we need to charge – Amp-sec
BattCapacityLeft = (float)((100 − battery.battSOC) *
        battery.battCapacityAhr * 36);
// Calculate average charge rate (Amps)
NeededRate = BattCapacityLeft / (float)TimeLeft / ChargeEfficiency;
//BMS returning a lull, no sense going through code
if (MaxChargeRate == 0) return 0;
// Find minimum time needed to finish charge
TimeRatio = BattCapacityLeft / ChargeEfficiency / MaxChargeRate;
//Find ratio of time left to min time left (use a weighting of constants)
TimeRatio /= TimeLeft;
//Event Management
if          ((FreqRegStatus & 0x04)==0x04)
        PercentOut=0;//UF Event, make sure output zerod
else if ((FreqRegStatus & 0x08)==0x08)
        PercentOut=100; //OF event, max us
else if (BattCapacityLeft <= 0)
        PercentOut=0; //we're charged
else {                      //Normal algorithm
        //Don't let exceed 1
        if ((TimeRatio > 1) || ((FreqRegStatus & 0x01)==0x01))
                TimeRatio=1;
        //Prior to critical regulation time, let adjust
        if (TimeLeft > TimeLeftLimitReg)   {
                // See how close our average rate is to the current rate
                SlopeDiffVal = (AvgRate − NeededRate);
                // Adjust the average rate accordingly opposite
                NeededRate = NeededRate − SlopeDiffVal;
        }
        //Otherwise, bias it up a little just to ensure we finish in time
        //(if there is headroom)
        else
                NeededRate += NeededRate / 100;
        //See if we've exceeded our upper limit
        RegRatio=((AvgRate − NeededRate) / MaxChargeRate) * 100;
        //If lower – continue as normal
        if (RegRatio <= UpDevPercent)   {
                //Clear flag just in case
                FreqRegStatus = (uint8)(FreqRegStatus & 0x01);
                //Limit needed rate to maximum rate if it has exceeded it
                if (NeededRate > MaxChargeRate)
                        AVGChargeRate=MaxChargeRate;
                else if (NeededRate < 0)
                        AVGChargeRate=0;    //Should never go below 0, but just in case
                else
                        AVGChargeRate=NeededRate;
                if (TimeRatio > TimeRatioCritCharge)       {
                        UpperChargeRate = (MaxChargeRate − AVGChargeRate);
                        LowerChargeRate = AVGChargeRate * (1 − TimeRatio);
                        //Set critical flag
                        FreqRegStatus = (uint8)(FreqRegStatus | 0x01);
                }
                else        {
                        UpperChargeRate = (MaxChargeRate − AVGChargeRate);
                        LowerChargeRate = AVGChargeRate;
                }
        }
        else    {       //Over rate, throttle us back...unless we are in time trouble
                //Flag as overage condition
                FreqRegStatus = (uint8)(FreqRegStatus | 0x02);
                //Limit needed rate to maximum rate if it has exceeded it
                if (NeededRate > MaxChargeRate)
                        AVGChargeRate = MaxChargeRate;
                else if (NeededRate < 0)
                        AVGChargeRate = 0;      //Should never go below 0, but just in case
                else
                        AVGChargeRate = NeededRate;
                //Critical zone check
                if (TimeRatio > TimeRatioCritCharge) {
```

TABLE A-continued

```
            UpperChargeRate = (MaxChargeRate – AVGChargeRate);
            LowerChargeRate = AVGChargeRate * (1 – TimeRatio);
            //Set critical flag
            FreqRegStatus   = (uint8)(FreqRegStatus | 0x01);
        }
        //Non-critical.  Limit Reg up – limit to average
        else    {
        //If plenty of regulation time, business as usual
        if (TimeLeft > TimeLeftLimitReg) {
                if (AvGChargeRate > MaxChargeRate)
                        UpperChargeRate = 0;
                else
                        UpperChargeRate = MaxChargeRate – AVGChargeRate;
                LowerChargeRate = AVGChargeRate;
                }
                //Less than critical amount, pull up the base and
                //expand the top limit
        else {
                if ((MaxChargeRate/2) > AVGChargeRate)
                        UpperChargeRate = (MaxChargeRate – AVGChargeRate) / 3;
                else
                        UpperChargeRate = (MaxChargeRate – AVGChargeRate);
                        LowerChargeRate = AVGChargeRate / 3;
                }
        //Clear all flags except possible critical
        FreqRegStatus = (uint8)(FreqRegStatus & 0xFE);
        }
}
//Determine percentage out
if (PeriodAvg > Period)        {          //Regulation up
        //Avg Freq = Max Freq?
        if (PeriodAvg == MaxFreqVal)
                PercentMax = UpperChargeRate;
        else    {
                PercentMax = (float)MaxFreqVal / (float)Period;
                PercentMax *= (PeriodAvg – Period);
                PercentMax /= (PeriodAvg – MaxFreqVal);
                PercentMax *= UpperChargeRate;
        }
}
else { // Regulation down
        //Avg Freq = Min Freq?
        if (MinFreqVal == PeriodAvg)
                PercentMax = 0;
        else    {
                PercentMax = (float)MinFreqVal / (float)Period;
                PercentMax *= (PeriodAvg – Period);
                PercentMax /= (MinFreqVal – PeriodAvg);
                PercentMax *= LowerChargeRate;
        }
}
PercentMax += AVGChargeRate;
PercentMax *= (100 / MaxChargeRate);
if (PercentMax > 100)
        PercentOut = 100;
else if (PercentMax < 0)
        PercentOut = 0;
else
        PercentOut = (int)(PercentMax);
}
return PercentOut;
}
```

What is claimed is:

1. A battery charging control method comprising:

accessing information regarding a presence of at least one of a surplus and a deficiency of electrical energy upon an electrical power distribution system at a plurality of different moments in time;

monitoring a rate of charging of a rechargeable battery;

using the information and the rate of charging of the rechargeable battery, controlling an adjustment of an amount of the electrical energy provided from the electrical power distribution system to the rechargeable battery to charge the rechargeable battery.

2. The method of claim 1 wherein the accessing comprises monitoring an electrical characteristic of the electrical energy provided from the electrical power distribution system.

3. The method of claim 1 wherein the monitoring comprises monitoring the electrical characteristic of the electrical energy comprising frequency, and further comprising comparing the frequency of the electrical energy with respect to a nominal frequency of the electrical power distribution system, and wherein the controlling comprises controlling the amount of the electrical energy provided from the electrical power distribution system to charge the rechargeable battery as a result of the comparing.

4. The method of claim 1 wherein the accessing comprises receiving the information from the electrical power distribution system.

5. The method of claim 1 wherein the controlling comprises controlling an increase in the amount of the electrical energy provided from the electrical power distribution system to charge the rechargeable battery as a result of the information indicating that the surplus of electrical energy exists on the electrical power distribution system.

6. The method of claim 5 further comprising detecting that the surplus of the electrical energy exceeds a threshold, and wherein the controlling comprises controlling the adjustment of the amount of the electrical energy provided from the electrical power distribution system to the rechargeable battery to be a maximum amount as a result of the detecting the surplus of the electrical energy exceeding the threshold.

7. The method of claim 1 wherein the controlling comprises controlling a decrease in the amount of the electrical energy provided from the electrical power distribution system to charge the rechargeable battery as a result of the information indicating that the deficiency of electrical energy exists on the electrical power distribution system.

8. The method of claim 7 further comprising detecting that the deficiency of the electrical energy exceeds a threshold, and wherein the controlling comprises controlling the adjustment of the amount of the electrical energy provided from the electrical power distribution system to the rechargeable battery to be a minimum amount as a result of the detecting the deficiency of the electrical energy exceeding the threshold.

9. The method of claim 1 further comprising:
accessing a desired point in time in the future for the rechargeable battery to reach a desired state of charge;
monitoring a remaining amount of time until the desired point in time; and
controlling the adjustment of the amount of the electrical energy provided from the electrical power distribution system to charge the rechargeable battery as a result of the monitoring of the remaining amount of time.

10. The method of claim 1 wherein the controlling comprises controlling the adjustment of the amount of the electrical energy at a plurality of different moments in time during a common charge cycle of the rechargeable battery, and wherein the controlling further comprises controlling an increase of the amount of the electrical energy provided from the electrical power distribution system to the rechargeable battery at a first of the moments in time of the common charge cycle and controlling a decrease in the amount of electrical energy provided from the electrical power distribution system to the rechargeable battery at a second of the moments in time of the common charge cycle.

11. The method of claim 1 wherein the monitoring comprises monitoring an average rate of charging of the rechargeable battery.

12. An electric vehicle charging method comprising:
coupling an electrical vehicle having a depleted state of charge with an electrical power distribution system;
charging the electrical vehicle using electrical energy from the electrical power distribution system;
monitoring an electrical characteristic of the electrical energy from the electrical power distribution system;
monitoring a remaining amount of time until a desired point in time in the future for the electric vehicle to have a desired amount of stored energy;
adjusting an amount of the electrical energy provided from the electrical power distribution system to charge the electrical vehicle as a result of the monitoring of the electrical characteristic and the monitoring of the remaining amount of time.

13. The method of claim 12 wherein the monitorings individually comprise monitoring passively at the location of the electrical vehicle without data communications to the electrical power distribution system.

14. The method of claim 12 wherein the monitoring the electrical characteristic comprises monitoring the electrical characteristic of the electrical energy comprising frequency, and further comprising comparing the frequency of the electrical energy with respect to a nominal frequency of the electrical power distribution system, and wherein the adjusting comprises adjusting the amount of the electrical energy provided from the electrical power distribution system to charge the rechargeable battery as a result of the comparing.

15. The method of claim 14 wherein the adjusting comprises increasing the amount of the electrical energy provided from the electrical power distribution system to charge the rechargeable battery at a first moment in time as a result of the comparing detecting that the frequency of the electrical energy is greater than a nominal frequency at the first moment in time, and decreasing the amount of the electrical energy provided from the electrical power distribution system to charge the rechargeable battery at a second moment in time as a result of the comparing detecting that the frequency of the electrical energy is less than the nominal frequency at the second moment in time.

16. The method of claim 12 wherein the monitoring comprises monitoring the remaining amount of time for the electric vehicle to have the desired amount of stored energy comprising a desired state of charge.

17. The method of claim 12 wherein the coupling comprises coupling the electrical vehicle with the electrical power distribution system which is an electrical grid.

18. The method of claim 12 wherein the electrical characteristic of the electrical energy which is monitored is frequency of the electrical energy.

19. A battery charging apparatus comprising:
processing circuitry configured to access information indicating at least one of a surplus and a deficiency of electrical energy upon the electrical power distribution system and to control an adjustment of an amount of electrical energy provided from the electrical power distribution system to a rechargeable battery to charge the rechargeable battery using the information; and
wherein the processing circuitry is configured to monitor a rate of charging of the rechargeable battery and to control the adjustment of the amount of the electrical energy provided from the electrical power distribution system to the rechargeable battery as a result of the monitoring of the rate of charging of the rechargeable battery.

20. The apparatus of claim 19 wherein the processing circuitry is configured to monitor an electrical characteristic of the electrical energy received from the electrical power distribution system to access the information.

21. The apparatus of claim 20 wherein the processing circuitry is configured to monitor the electrical characteristic of the electrical energy comprising frequency, to compare the frequency of the electrical energy with respect to a nominal frequency of the electrical power distribution system, and to control the adjustment of amount of the electrical energy provided from the electrical power distribution system to charge the rechargeable battery as a result of the comparison.

22. The apparatus of claim 19 wherein the processing circuitry is configured to control an increase in the amount of the electrical energy provided from the electrical power distribution system to charge the rechargeable battery as a result of the information indicating that the surplus of electrical energy exists on the electrical power distribution system at a first moment in time and to control a decrease in the amount of the electrical energy provided from the electrical power distribution system to charge the rechargeable battery as a result of the information indicating that the deficiency of electrical energy exists on the electrical power distribution system at a second moment in time.

23. The apparatus of claim 22 wherein the processing circuitry is configured to control the adjustment of the amount of the electrical energy provided from the electrical power distribution system to the rechargeable battery to be a maximum amount as a result of the surplus of the electrical energy exceeding a first threshold and to control the adjustment of the amount of the electrical energy provided from the electrical power distribution system to the rechargeable battery to be a minimum amount as a result of the deficiency of the electrical energy exceeding a second threshold.

24. The apparatus of claim 19 wherein the processing circuitry is configured to access a desired point in time in the future for the rechargeable battery to have a desired state of charge, to monitor a remaining amount of time until the desired point in time, and to control the adjustment of the amount of the electrical energy provided from the electrical power distribution system to charge the rechargeable battery as a result of the monitoring of the remaining amount of time.

25. The apparatus of claim 19 wherein the processing circuitry is configured to control the adjustment of the amount of the electrical energy provided from the electrical power distribution system to the rechargeable battery at a plurality of different moments in time during a common charge cycle of the rechargeable battery, and wherein the processing circuitry is configured to control an increase of the amount of the electrical energy provided from the electrical power distribution system to the rechargeable battery at a first of the moments in time of the common charge cycle and to control a decrease in the amount of electrical energy provided from the electrical power distribution system to the rechargeable battery at a second of the moments in time of the common charge cycle.

26. The apparatus of claim 19 wherein the processing circuitry is configured to access the information indicating at least one of a surplus and a deficiency of electrical energy upon the electrical power distribution system which is an electrical grid.

27. A rechargeable battery system comprising:
a charger coupled with an electrical power distribution system and configured to provide electrical energy from the electrical power distribution system to a rechargeable battery to charge the rechargeable battery; and
processing circuitry configured to monitor for a presence of at least one of a surplus and a deficit of electrical energy upon the electrical power distribution system and to control the charger to adjust an amount of the electrical energy provided from the electrical power distribution system to the rechargeable battery as a result of the monitoring detecting the presence of the at least one of the surplus and the deficit of the electrical energy upon the electrical power distribution system; and
wherein the processing circuitry is configured to monitor a remaining amount of time until a desired point in time in the future for the rechargeable battery to have a desired amount of stored energy, and to control the charger to adjust the amount of the electrical energy provided from the electrical power distribution system to the rechargeable battery as a result of the monitoring of the remaining amount of time.

28. The system of claim 27 wherein the processing circuitry is configured to monitor for the presence of the at least one of the surplus and the deficit passively at the location of the rechargeable battery system without data communications to the electrical power distribution system.

29. The system of claim 28 wherein the processing circuitry is configured to monitor an electrical characteristic of the electrical energy to monitor for the presence of the at least one of the surplus and the deficit of electrical energy.

30. The system of claim 27 wherein the processing circuitry is configured to monitor an electrical characteristic of the electrical energy comprising frequency to monitor for the presence of the at least one of the surplus and the deficit of electrical energy, to compare the frequency of the electrical energy with respect to a nominal frequency of the electrical power distribution system, and to control the charger to adjust the amount of the electrical energy provided from the electrical power distribution system to charge the rechargeable battery as a result of the comparison.

31. The system of claim 30 wherein the processing circuitry is configured to control the charger to provide an increase in the amount of the electrical energy provided from the electrical power distribution system to charge the rechargeable battery at a first moment in time as a result of the comparison detecting that the frequency is greater than a nominal frequency of the electrical power distribution system at the first moment in time, and to control the charger to provide a decrease in the amount of the electrical energy provided from the electrical power distribution system to charge the rechargeable battery at a second moment in time as a result of the comparison detecting that the frequency is less than the nominal frequency at the second moment in time.

32. The system of claim 27 further comprising the rechargeable battery.

33. An energy storage apparatus comprising:
circuitry configured to receive electrical energy from an electrical grid which is external of the energy storage apparatus and to use the received electrical energy to provide energy to an energy storage device which is configured to store the energy; and
wherein the circuitry is further configured to access information regarding a state of balance of consumption and generation of electrical energy upon the electrical grid and to control an adjustment of an amount of the energy which is provided to the energy storage device for storage using the information regarding the state of balance of the consumption and generation of electrical energy upon the electrical grid; and
wherein the circuitry is configured to monitor a remaining amount of time until a desired point in time in the future for the energy storage device to have a desired amount of stored energy, and to control the adjustment of the amount of the energy which is provided to the energy storage device for storage as a result of the monitoring of the remaining amount of time.

34. The apparatus of claim 33 further comprising the energy storage device which is configured to store energy.

35. The apparatus of claim 34 wherein the energy storage device is a rechargeable battery and the circuitry comprises charging circuitry which is configured to provide the energy comprising charging electrical energy to the rechargeable battery to charge the rechargeable battery.

36. The apparatus of claim 33 wherein the circuitry is configured to adjust the amount of the energy which is provided to the energy storage device to reduce a difference between the consumption and generation of the electrical energy upon the electrical grid.

37. The apparatus of claim 33 wherein the circuitry is configured to monitor an electrical characteristic of the electrical energy upon the electrical grid to access the information regarding the state of balance of consumption and generation of electrical energy upon the electrical grid.

38. The apparatus of claim 37 wherein the circuitry is configured to monitor the electrical characteristic of the electrical energy comprising frequency, to compare the frequency of the electrical energy with respect to a nominal frequency of the electrical grid, and to control the adjustment of the amount of energy which is provided to the energy storage device as a result of the comparison.

39. The apparatus of claim 33 wherein the circuitry is configured access the information from the electrical grid.

40. The apparatus of claim 33 wherein the circuitry is configured to control an increase in the amount of the energy which is provided to the energy storage device as a result of the information indicating that the generation of electrical energy exceeds the consumption of electrical energy upon the electrical grid.

41. The apparatus of claim 33 wherein the circuitry is configured to control an increase in the amount of the electrical energy which is provided to the energy storage device to a maximum amount as a result of the information indicating that a surplus of the electrical energy upon the electrical grid exceeds a threshold.

42. The apparatus of claim 33 wherein the circuitry is configured to decrease the amount of the energy which is provided to the energy storage device as a result of the information indicating that the consumption of electrical energy exceeds the generation of electrical energy upon the electrical grid.

43. The apparatus of claim 33 wherein the circuitry is configured to monitor frequency of the electrical energy upon the electrical grid to access the information regarding the state of balance of consumption and generation of the electrical energy upon the electrical grid.

44. An energy storage method comprising:
using electrical energy received from an electrical grid, providing energy to an energy storage device which is configured to store the energy to charge the energy storage device;
accessing information regarding a state of balance of consumption and generation of electrical energy upon the electrical grid;
monitoring a rate of charging of the energy storage device; and
controlling an adjustment of an amount of the energy provided to the energy storage device using the information regarding the state of balance of the consumption and generation of electrical energy upon the electrical grid and the rate of charging of the energy storage device.

45. The method of claim 44 wherein the energy storage device is a rechargeable battery and the providing comprises charging the rechargeable battery using the electrical energy received from the electrical grid.

46. The method of claim 44 wherein the controlling comprises controlling the adjustment to reduce a difference between the consumption and generation of the electrical energy upon the electrical grid.

47. The method of claim 44 wherein the accessing comprises monitoring an electrical characteristic of the electrical energy upon the electrical grid which is indicative of the state of balance of the consumption and generation of the electrical energy upon the electrical grid.

48. The method of claim 47 wherein the monitoring the electrical characteristic comprises monitoring the electrical characteristic of the electrical energy comprising frequency, and further comprising comparing the frequency of the electrical energy with respect to a nominal frequency of the electrical grid, and wherein the controlling comprises controlling using the comparing.

49. The method of claim 44 wherein the accessing comprises accessing the information from the electrical grid.

50. The method of claim 44 wherein the controlling comprises increasing the amount of the energy which is provided to the energy storage device as a result of the information indicating that the generation of electrical energy exceeds the consumption of electrical energy upon the electrical grid.

51. The method of claim 44 wherein the controlling comprises increasing the amount of the energy which is provided to the energy storage device to a maximum amount as a result of the information indicating that a surplus of the electrical energy upon the electrical grid exceeds a threshold.

52. The method of claim 44 wherein the controlling comprises decreasing the amount of the energy which is provided to the energy storage device as a result of the information indicating that the consumption of electrical energy exceeds generation of electrical energy upon the electrical grid.

* * * * *

UNITED STATES PATENT AND TRADEMARK OFFICE
CERTIFICATE OF CORRECTION

PATENT NO. : 8,183,826 B2
APPLICATION NO. : 12/467192
DATED : May 22, 2012
INVENTOR(S) : Francis K. Tuffner et al.

Page 1 of 1

It is certified that error appears in the above-identified patent and that said Letters Patent is hereby corrected as shown below:

Column 8, line 31 – Replace "the charge the" with --charge the--.

Column 17, line 10 (Table A-continued) – Replace "(if AvGCharge>MaxCharge Rate)" with --(if AVGCharge>MaxCharge Rate)--.

Column 23, line 17 – Replace "configured access" with --configured to access--.

Signed and Sealed this
Twenty-eighth Day of August, 2012

David J. Kappos
*Director of the United States Patent and Trademark Office*